United States Patent [19]
Burgess

[11] Patent Number: 6,135,299
[45] Date of Patent: Oct. 24, 2000

[54] PRODUCT DISPLAY AND TRANSPORT RACK

[75] Inventor: Thomas E. Burgess, Geneva, Ill.

[73] Assignee: B 4 Enterprises, Inc., North Aurora, Ill.

[21] Appl. No.: 09/330,732

[22] Filed: Jun. 11, 1999

[51] Int. Cl.[7] .................................................. A47B 43/00
[52] U.S. Cl. .......................................... 211/194; 211/150
[58] Field of Search ................................. 211/153, 151, 211/144, 134, 150, 194, 186, 188; 280/79.3; 108/55.1, 56.1, 53.1, 91

[56] References Cited

U.S. PATENT DOCUMENTS

| | | | |
|---|---|---|---|
| 870,835 | 11/1907 | Loew | 211/150 |
| 2,484,996 | 10/1949 | Hatch | 211/150 |
| 2,699,911 | 1/1955 | Chase et al. | 211/194 |
| 2,940,597 | 6/1960 | Machielse et al. | 211/194 |
| 3,007,708 | 11/1961 | Ochs | 211/194 |
| 3,094,951 | 6/1963 | Levinson | 211/188 |
| 3,193,093 | 7/1965 | Hansen | 211/194 |
| 3,224,388 | 12/1965 | Skubic | 211/194 |
| 3,506,138 | 4/1970 | Travis | 211/19 |
| 3,517,828 | 6/1970 | Hunter | 211/194 |
| 3,565,018 | 2/1971 | Jay | 108/55.1 |
| 3,709,163 | 1/1973 | Smedley et al. | 108/53.1 |
| 3,894,634 | 7/1975 | Gotham et al. | 211/150 |
| 3,945,501 | 3/1976 | Jay | 108/53.1 |
| 3,953,044 | 4/1976 | Wilson | 280/79.3 |
| 4,056,195 | 11/1977 | Keith | 211/153 |
| 4,199,069 | 4/1980 | Talarico | 211/194 |
| 4,482,066 | 11/1984 | Dykstra | 211/151 |
| 4,773,547 | 9/1988 | Bell | 211/194 |
| 4,934,538 | 6/1990 | Beyer | 211/194 |
| 5,096,648 | 3/1992 | Johnson et al. | 211/151 |
| 5,221,014 | 6/1993 | Welch et al. | |
| 5,233,931 | 8/1993 | McCorkle, Jr. | 108/55.1 |
| 5,324,105 | 6/1994 | Christensen | 211/150 |
| 5,452,811 | 9/1995 | Taravella et al. | 211/188 |
| 5,553,551 | 9/1996 | Crombie . | |
| 5,647,284 | 7/1997 | Frysinger et al. | 108/55.1 |
| 5,692,625 | 12/1997 | Filipescu et al. | 211/194 |
| 5,718,441 | 2/1998 | Kern et al. | 280/79.3 |
| 5,816,419 | 10/1998 | Lamson | 211/150 |
| 5,833,083 | 11/1998 | Miller | 211/150 |
| 5,887,732 | 3/1999 | Zimmer et al. | 211/151 |
| 5,906,165 | 5/1999 | McCorkle, Jr. et al. | 108/55.1 |

OTHER PUBLICATIONS

Rehrig International brochure displaying Mobile Merchandising Unit.—Undated (Pre–to Jun., 1998).

Cannon Equipment brochure introducing various cart–based product storage and handling sytems. Undated (Pre–Jun., 1998).

Met brochure displaying storage carts. Undated (Pre–Jun., 1998).

V.W. Systems brochure displaying Wing Pallets. Undated (Pre–Jun., 1998).

*Primary Examiner*—Daniel P. Stodola
*Assistant Examiner*—Jennifer E. Novosad
*Attorney, Agent, or Firm*—Banner & Witcoff, Ltd.

[57] ABSTRACT

A display rack is comprised of a multiple stacked frames which are engaged with each other by a socket and pin connection wherein the skirts are provided to insure that the pin will properly engage with the socket. In a preferred embodiment, the skirt is provided around sockets associated with the upper frame member inasmuch as the skirts also serve as support pads for the frame.

14 Claims, 5 Drawing Sheets

PRODUCT DISPLAY AND TRANSPORT RACK

BACKGROUND OF THE INVENTION

Briefly, the present invention relates to a display rack of the type which is comprised of separate, stackable frames, each frame including one or more optional sliding and tilting shelves for access to and display of products.

Heretofore, when displaying plant products, for example at a nursery, it has been customary to utilize steel display racks. The racks are typically in the form of a rectangular parallelpiped, steel frame with multiple horizontal shelves mounted on the frame. Often, such racks are mounted on rollers or wheels so that they can be easily moved.

One of the problems with such display racks is accessibility to the materials or items stored on the racks. Items at the center of the rack are often difficult to reach. This results because the steel frame members may interfere with access, or the spacing of shelves may restrict easy access. If the racks are part of a consumer display, consumers are discouraged by a construction that prevents easy access to the products on the storage rack.

Another problem associated with such racks is that the racks are often too high for easy access by consumers. As a result, products toward the top shelves of a rack are often inaccessible to the average consumer. On the other hand, growers, shippers and merchandisers desire to have large or tall racks with large shelves so that they can easily maximize transportation and storage space, and otherwise move products on such shelving or racks. The effort to meet the desires and needs of the growers, shippers and merchandisers as contrasted to those of the consumer, thus presents a number of challenging problems in rack design.

SUMMARY OF THE INVENTION

In a principal aspect, the present invention comprises a display rack which includes two or more stackable frames, each frame having an optional series or plurality of horizontal, slidable shelves. The shelves may slide outwardly from the frame to enhance access to product stored on the shelves. The shelves may also tilt downwardly to further enhance the display of products stored on the shelves. The separate, stackable frames include a pin and socket construction which enables the frames to be easily joined together in a vertical array for transport or to be disengaged one from the other for the purpose of customer display and access. Vertical posts of one frame include socket members with specially designed skirts to guide connecting pins into sockets of the adjacent stacked frame member. The skirts may also function as frame supports.

Thus, it is an object of the invention to provide an improved, multiple section display rack comprised of two or more frames which may be stacked one upon the other, or disengaged to provide separate display frames.

A further object of the invention is to provide a display rack construction which may include sliding shelves that permit easy access to products displayed on the shelves.

Yet another object of the invention is to provide a multiple unit display rack which includes a construction that facilitates the alignment and engagement of the frames when they are stacked upon one another to form a multiple display rack assembly, shipping rack, or storage rack.

Yet a further object of the invention is to provide an improved multiple section, display rack which is highly functional, easy to use, economic to manufacture, rugged and capable of being constructed in numerous sizes and configurations.

A further object of the invention is to provide a multiple section rack construction wherein racks may be stacked vertically upon each other and further wherein any of the separate racks may be positioned at the bottom of the stack in support of the other racks.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
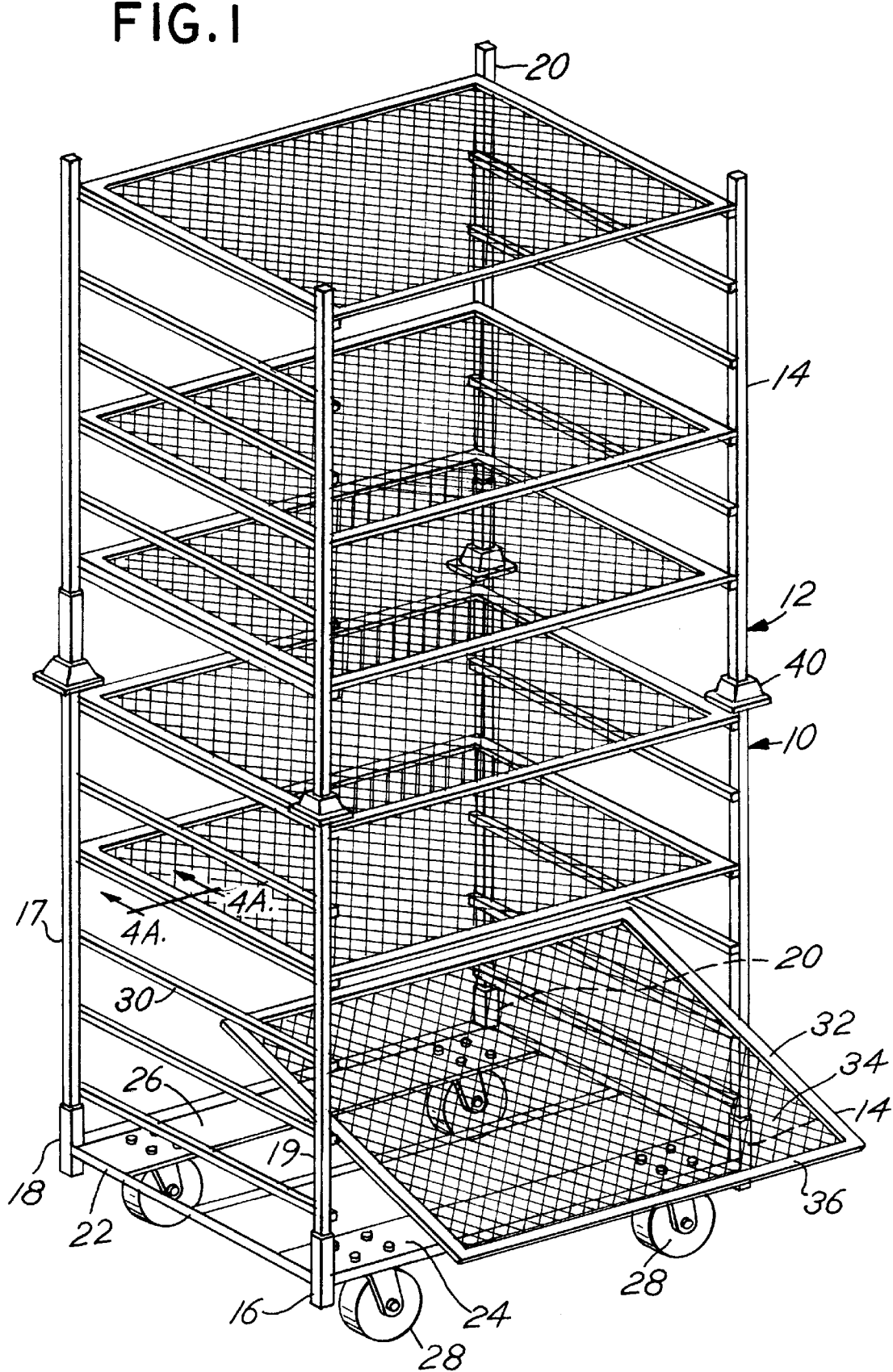
FIG. 1 is an isometric view of a first embodiment of a multiple section display rack comprised of first and second frames wherein the frames incorporate the various features of the invention.

FIGS. 1–8 illustrate a first embodiment of the invention. The display rack of FIGS. 1–8 is comprised typically of a first frame or rack 10 and a second frame or rack 12. The frames 10, 12 are stacked, but separable. Typically, each frame 10, 12 is in the form of a rectangular parallelpiped, though the form of the frame is not a limiting feature of the invention. The following description is, however, directed to a rectangular parallelpiped form of the frames 10, 12.

Each frame 10, 12 includes a lower frame section 11 comprising four generally vertical, short corner posts 14, 16, 18, and 20. The four corner posts 14, 16, 18, 20 are connected side-to-side by extending cross members 22 and end-to-end by longitudinal plates 24 and 26. Wheels or casters 28 may be attached to the underside of the plates 24, 26 so that the frame section 11 and thus frame 10 is mobile.

A rectangular side bracket 15 comprised of spaced vertical posts 17, 19 connected by horizontal, spaced cross members 30 is fitted into pairs of corner posts 14, 20 and 16, 18, respectively. Thus, each bracket 15 has the physical appearance of a ladder with spaced vertical posts 17, 19 and spaced horizontal, cross members 30. The bottom end of each post 17, 19 is fitted into a socket defined in the top of an associated short post 14, 16, 18, or 20 and may be separated from the post 14, 16, 18, 20 when the rack 10 is disassembled. Thus, a single lower frame section 11 and two brackets 15 comprise three sides of the rack 10 (or 12). Shelves 32 comprised the additional part of the combination comprising each rack 10, 12.

Figure 4:
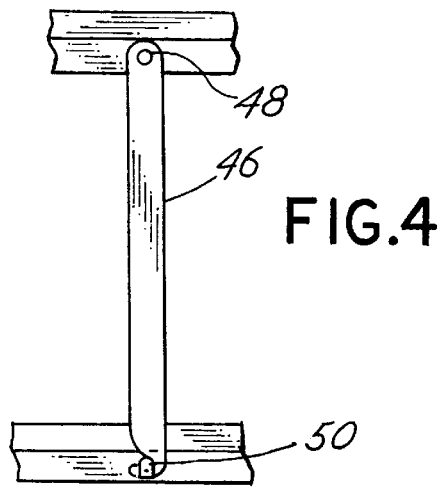
FIG. 4 is an enlarged side elevation view of the latch bar construction for connecting adjacent stacked frames forming a multiple unit display rack.
Figure 4A:
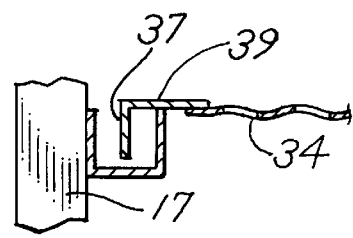
FIG. 4A is a cross sectional view of a portion of the rack taken along the line 4A—4A in FIG. 1.
Figure 5:
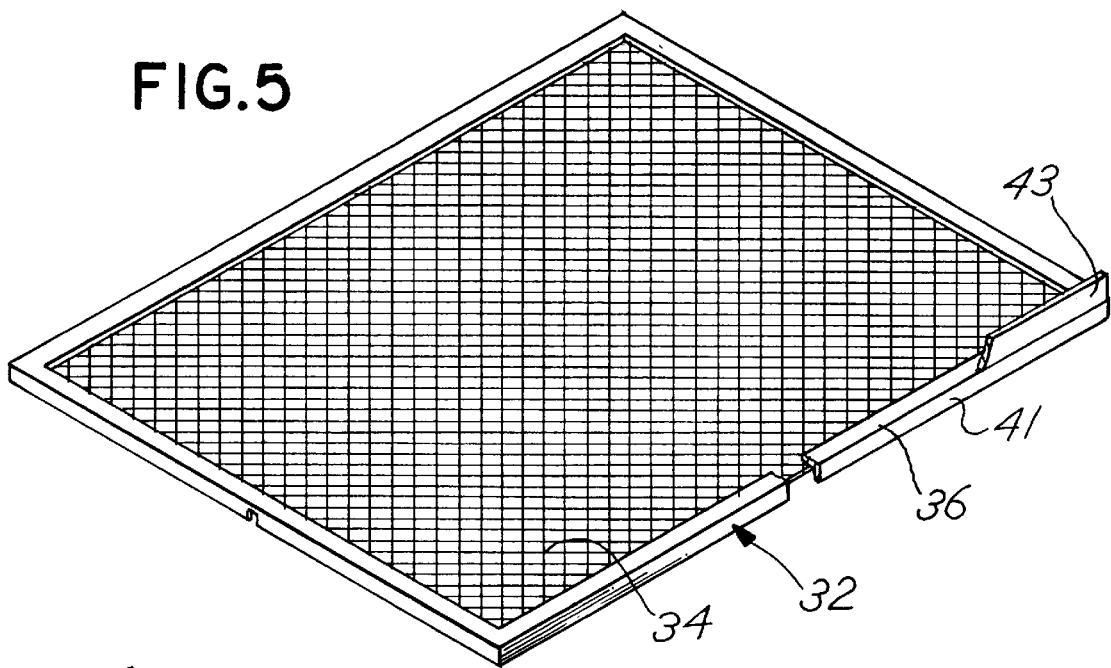
FIG. 5 is an enlarged isometric view of the slide shelf construction utilized on the frames of the rack of FIG. 1.
Figure 6:
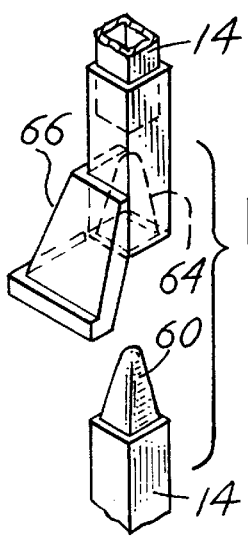
FIG. 6 is an enlarged exploded isometric view showing the separate pin and socket arrangement of adjacent frames.

The spaced cross members 30 each have a U-shaped cross section as depicted in FIG. 4A with a blocking plate 56 at each end of the trough created by the cross member 30.

Shelves 32 slide on cross members or rails 30. Thus, a shelf 32 which is formed from expanded metal 34 mounted on a rectangular frame 36 is slidable on the rails 30 into and out of the profile or plan view pattern defined by the frame 10. Similar shelves 32 are provided for the frame 12.

Figure 8:
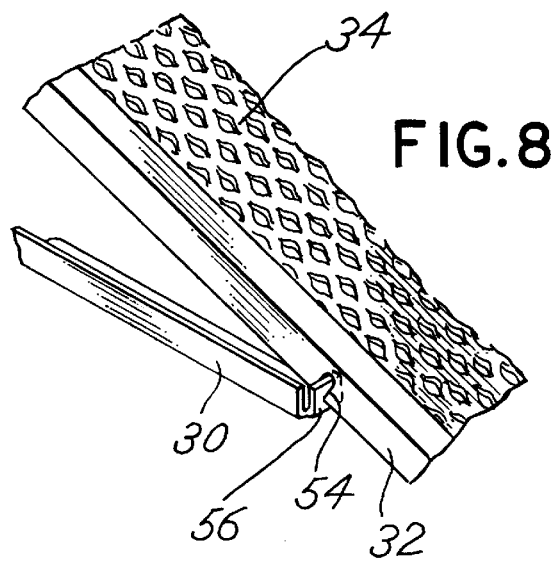
FIG. 8 is an enlarged isometric view illustrating a tilted shelf construction of the display rack of FIG. 1.
Figure 7:
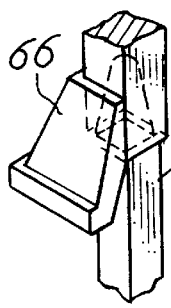
FIG. 7 is an isometric view of the pin and socket detail of FIG. 6 wherein the parts are coupled.

The rectangular frame 36 of each shelf 32 includes opposite side bars 33, 35 which include a vertical leg 37 and a horizontal leg 39 as shown in FIG. 4A. Expanded metal 34 is attached to the inside of the frame 36. A front cross bar 41 of frame 36 may also include an upwardly extending lip 43 to retain product on shelf 32 when shelf 32 is tilted, for example. The leg 37 may include a slot 54 as shown in FIG. 8 to engage a vertical plate or stop 56 at the end of slide or cross member 30. A stop 56 is provided at each end of the slide member 30 to retain frame 36 and thus shelf 32 from accidentally sliding. Further, the construction of shelf 32 in combination with cross member 30 maintains connection between opposite side brackets 15. Thus, shelves 32 prevent brackets 15 from spreading apart, yet the shelves 32 remain slidable and tiltable as discussed hereinafter.

Figure 2:
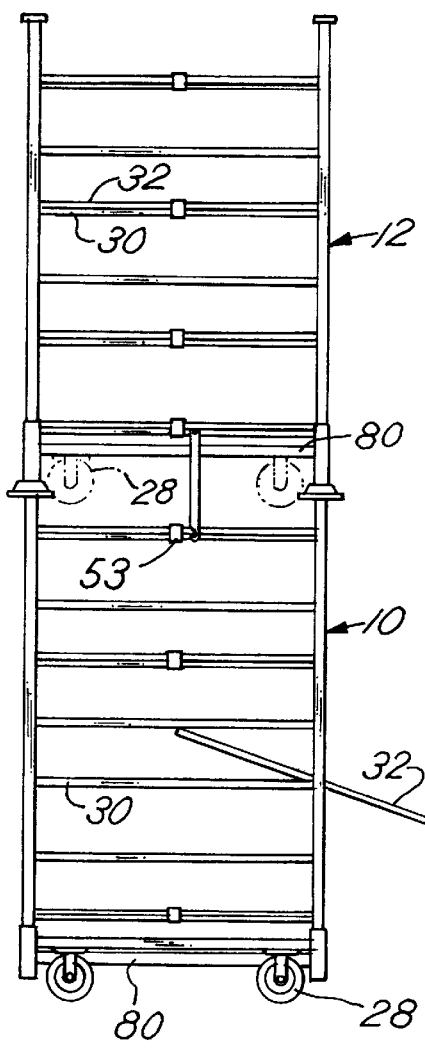
FIG. 2 is a side elevation view of the rack of FIG. 1.

The separate frames 10, 12 are engageable and separable at a connection or junction 40 between associated posts 17, 19 and 14, 20 or 16, 18. As shown in FIG. 2, the frames 10 and 12, when assembled together connect their aligned corner posts 14, 16, 18, 20 and 17, 19. When stacked, the frames 10, 12 can be attached or locked together by means of a latch bar 46. The latch bar 46 pivots about a pivot connection 48 on one cross member 30 of frame 10 and may engage a hook 50 on a cross member 30 on the other frame 12. When the latch bar 46 is released from the hook 50, the upper frame 12 may be disengaged from the lower frame 10.

The shelf 32 may be tilted about the end or stop 56 thus facilitating enhanced display of products on the shelf 32. The frame 36 in such a circumstance will include the lip or ledge 43 along its front edge to retain product from sliding off of shelf 32.

Shelf 32 is also retained horizontally on slide 30 by a retaining bracket 53 which fits over the side of frame 36 as it slides on the side member defining slide 30. Bracket or retainer 53 is positioned approximately at the longitudinal midpoint of slide 30 in a size and manner to retain shelf 32 in an horizontal position when it is moved in either direction on slide 30. Thus shelf 32, with product thereon, may slide in either direction on slide 30 to enhance product display and access and in each instance, will be retained in a horizontal, cantilever position by bracket or retainer 53. In use in the field, alternate shelves 32 must preferably be projected in opposite directions from a frame 12. This further enhances customer access to displayed product and also prevents an off-balanced display which could tip over. To assist this arrangement, the stop plate 56 at each end of alternate vertically spaced slides 30 is enlarged to prevent sliding movement of the shelf 32 in one direction and to prevent proper engagement with slot 54 if the shelf 32 is moved. Thus, plate 56 will have a greater vertical height when provided to block sliding movement of shelf 32 at one end on the other of slide 30.

Also, to tilt a shelf 32, clip or bracket 53 may be released. When bracket 53 is released and frame 36 tilted, the underside of the next upwardly adjacent vertical slide 30 will engage frame 36 and restrict the amount of downward tilt of shelf 32.

The vertical posts, such as post 17, 19, include a special connection construction to engage with short posts 14, 16, 18, 20 of frame section 11. Thus, post 17 of the lower frame 10 includes a projecting pin 60 which projects generally vertically upward from the top end of the post 17. A peripheral flange 62 may be included around the pin 60 to limit the distance the pin 60 will fit into a socket that is described below.

The post 14 of the upper frame 12 in FIG. 1 includes a socket 64. The socket 64 is adapted to receive pin 60 of post 17 therein. The end of the post 17 thus engages against the flange 62 surrounding the pin 60 to limit the insertion of the pin 60 into the socket 64.

The shape of pin 60 is an important feature. Preferably, the socket 64 comprises a generally constant diameter circular passage in the form of a cylindrical tube, for example. Lower portion 61 of the pin 60 also has a uniform diameter extending for at least a portion of the height of the pin 60. The top 63 of the pin 60 is curved and of diminishing cross sectional diameter to effect guidance of the pin 60 into socket 64. By maintaining a length or portion 61 of uniform diameter at the lower end of pin 60, rigid connection between post 17 and post 14 is assured. The smaller diameter top 63 facilitates alignment of the pin 60 in socket 64.

In a preferred embodiment, the post 14 associated with every frame section 11 also includes a skirt 66 which extends approximately one-quarter of the circumference around the base of the post 14. The skirt 66 flares downwardly and outwardly from the post 14 and is preferably maintained within the profile defined by the frame section 11. In a preferred embodiment, therefore, the skirt 66 will not project outwardly beyond the profile defined by the frame section 11 or frame 12. Thus, skirt 66 does not typically project from the sides of the sides of frame 12 and thus will not extend to accidentally grasp or contact a user of the display rack assembly or interfere with adjacent racks to make it difficult or impossible to load and move racks close to one another in a trailer or truck.

The skirt 66 may alternatively extend totally around the periphery of the post 14 inasmuch as the skirt 66 may also serve as a support pad for the frame 12 when the frame 12 is removed from the frame 10 and the casters 28 are removed. The skirt 66 also serves the function of guiding the pin 60 into the socket 64. Skirts 66 are preferably provided for each of the posts 14, 16, 18, 20, although they need not necessarily be provided in every instance. Preferably, all of the skirts 66 are shaped and formed to lie within the profile defined by the frames 10 and/or 12, again so that they will not project outwardly and provide an obstruction to those that are using the display rack construction.

It is to be noted that the pins 60 in the disclosed embodiment project upwardly into sockets 64. The arrangement may be reversed and pins may project downwardly to be guided by skirts into the socket 64 in a lower frame 10. All of the pins 60 may thus project upwardly or downwardly or there may be a mix of those projecting upwardly and downwardly. Upward projection is preferred. Also, skirts 66 need not be provided for in every post 14, 16, 18, 20 in a parallelpiped frame 12. However, it is preferred that pins 60 and skirts 66 be provided for at least two of the four posts 14, 16, 18, 20 or 17, 19 connecting frames 10, 12.

Figure 3:
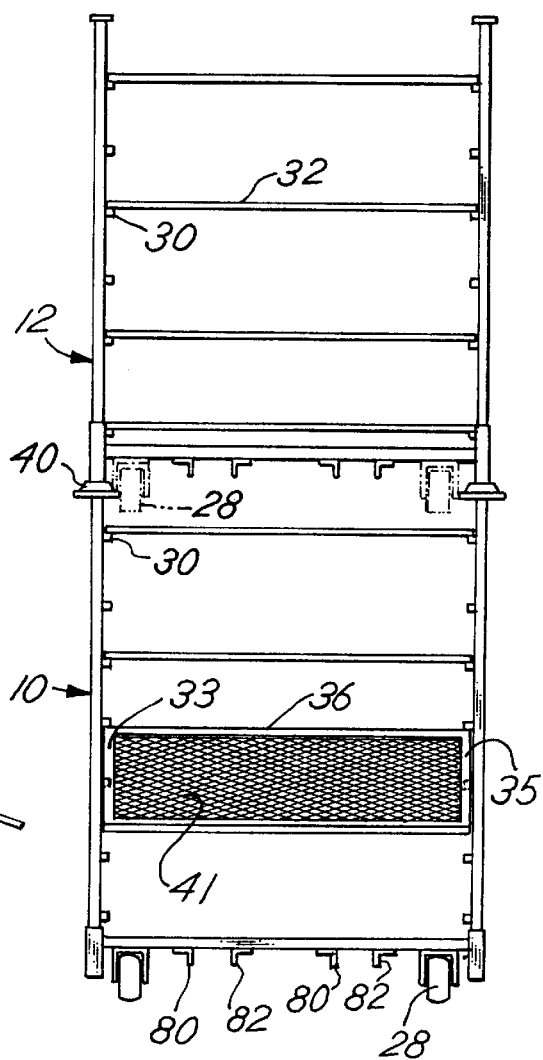
FIG. 3 is a front elevation view of the rack of FIG. 1.

Referring to FIGS. 2 and 3, there is depicted, particularly in FIG. 3, two pairs of fork lift guide bars 80 and 82. Guide bars 80 and 82 are spaced metal bars which are provided to guide the forks of a fork lift truck so that the frame 10 or stack of frames 10, 12, etc. may be engaged by the fork lift in a manner that will preclude sliding of the frames even when the frames 10, 12 are loaded. Thus, the forks are inserted between the pairs of guide bars 80 and 82. Note that the frames each include the guide bars 80 and 82. Thus, the upper frame 12 may be positioned upon the lower frame 10 by a fork lift which interacts with the described guide bars 80, 82.

Further, it is to be noted that only two frames, 10 and 12, have been shown in stacked relationship. However, multiple frames may be stacked one on top of the other. The vertical extent of the frames is determined, in part, by the frame sections 11. Thus, the vertical extent of the frame section 11 may also be altered or amended in order to meet particular requirements or needs. Further, the vertical frame members 15 may be of different length in order to provide frames such as frames 10 and 12 of different height.

Figure 9:
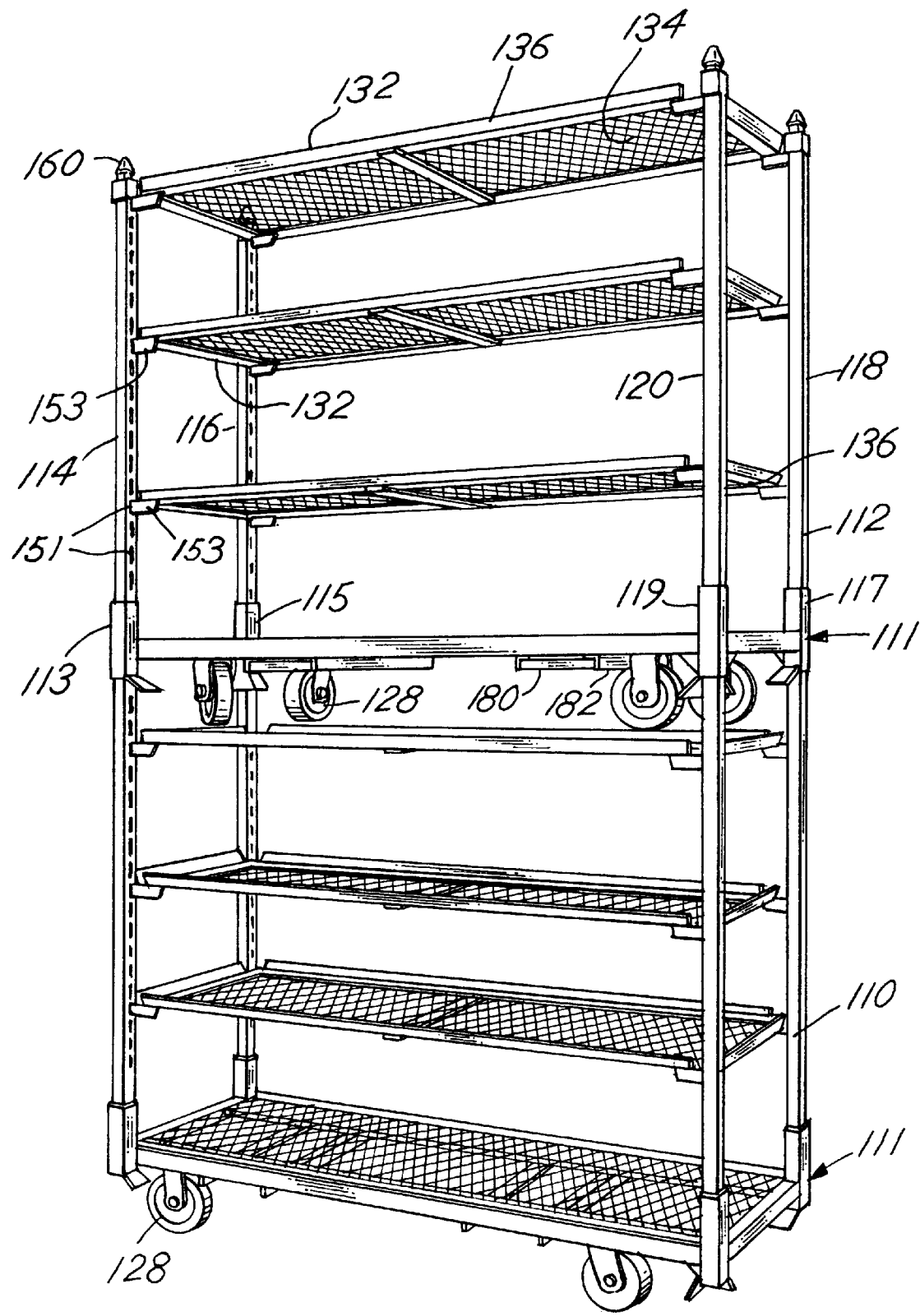
FIG. 9 is an isometric view of a second embodiment of a multiple section display rack incorporating features of the invention.
Figure 10:
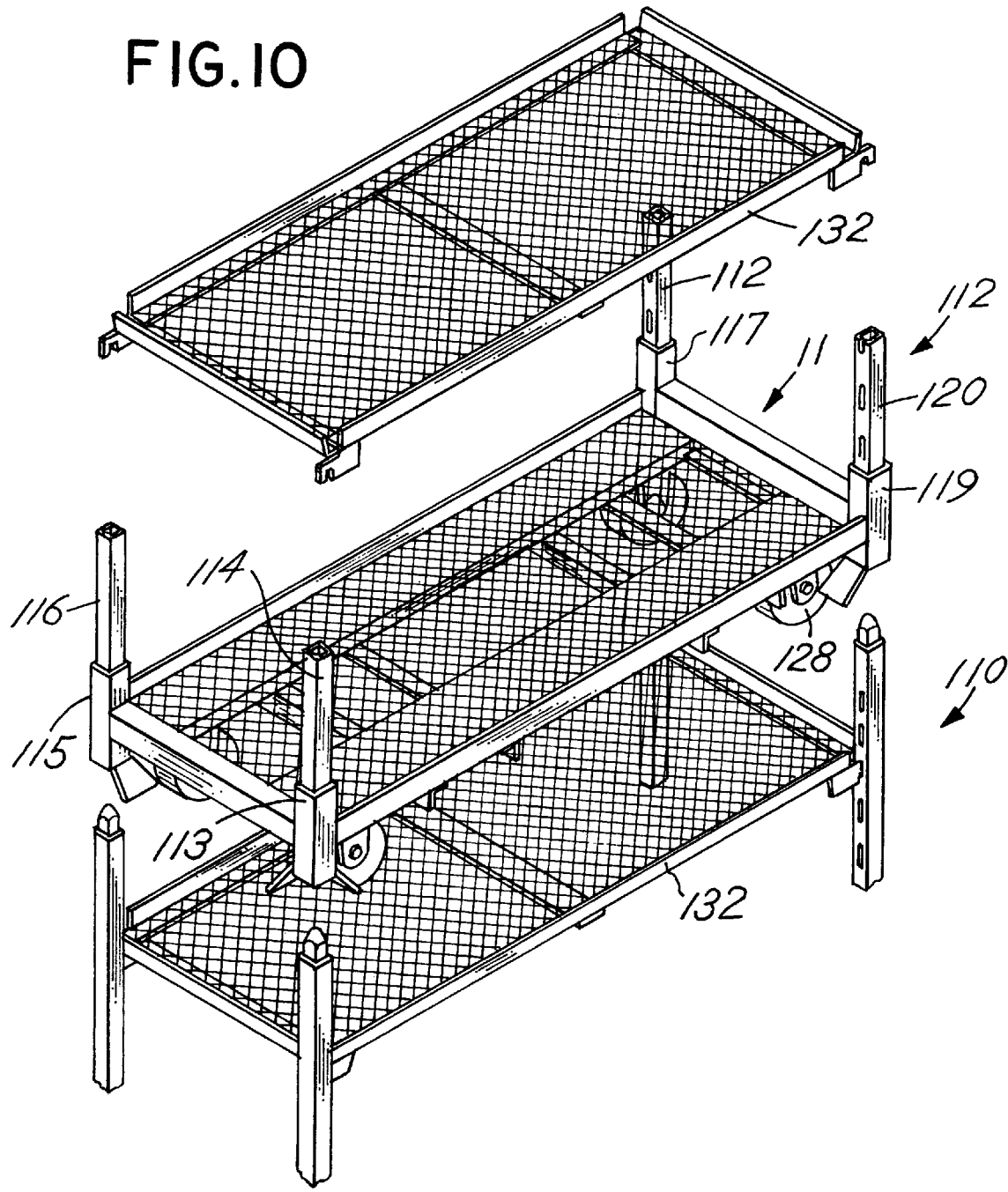
FIG. 10 is an exploded isometric view of the embodiment of FIG. 9.

FIGS. 9 and 10 illustrate a second embodiment of the invention. In FIGS. 9 and 10, frames 110 and 112 are comprised of frame sections 111 similar in construction to the embodiment of FIG. 1. Casters or wheels 128 are thus similarly provided as are fork lift guide bars 180 and 182. The embodiment of FIGS. 9 and 10, however, includes separate vertical posts 114, 116, 118 and 120 which fit respectively into rectangular guide openings of vertical short posts 113, 115, 117 and 119 of frame 111. Each of the vertical posts 114, 116, 118 and 120 include a pin connection construction 160 of the type previously described with respect to the embodiment of FIG. 1.

However, shelves 132 are fabricated from rectangular frames 136 and expanded metal 134. The shelves 132 are not moveable. Rather, the vertical posts 114, 116, 118 and 120 include slots 151 on the inside of each post. The end of each shelf 132 includes a locking tab 153 which is cooperative with a slot 151. In this manner, each shelf or frame assembly 110 and 112 is comprised of the lower frame section 111, posts 114, 116, 118 and 120, as well as shelves 132. The frame section 111 includes connecting pins, sockets and skirts of the type previously described with respect to the embodiment of FIG. 1.

The embodiment of FIGS. 9 and 10 is highly suited to a situation where sliding shelves are not required because the depth of the frames 110 and 112 is not great, and thus access to the shelves 132 is more easily obtained. In contrast, the embodiment of FIGS. 1–8 is designed for a situation wherein it is desirable to have shelves that slide, preferably alternate shelves sliding in opposite directions, so as to have easy access to the materials on the shelf for purposes of display and to promote balance. For purposes of storage, movement and the like, obviously, the shelves then would be retained within the profile defined by the frame.

It is possible to vary the construction of the invention by, for example, changing the shape of the pins and/or sockets, altering the shape of the skirts, rendering the skirts as discontinuous members which still effect guiding of the pin into the socket and by various other means. Thus, the invention is to be limited only by the following claims and equivalents thereof.

What is claimed is:

1. A multiple section display rack comprising, in combination:

a first frame including a plurality of vertically extending support posts with at least some of the posts including a pin projecting upwardly from said frame, said first frame further including shelving supported by the first frame; and a second frame including posts with at least some of the posts including vertically depending sockets arrayed in a pattern whereby the depending sockets may receive projecting pins of the first frame to removably support the second frame upon the first frame, said second frame including shelving supported by the second frame, the first frame pins being removable from the second frame sockets upon separation of the first and second frames, said second frame including a vertically downward and outward flared skirt on at least one of said posts whereby each skirt is positioned around a socket for engaging and guiding a pin of the first frame into a skirted socket of the second frame;

said first frame including a shelf with first and second side rails, said first frame further including at least one horizontal support rail extending between two of said plurality of support posts, said shelf side rails including a detent notch for receiving the at least one support rail and supporting the shelf at a position extending from the frame.

2. The display rack of claim 1 wherein the skirt extends partially around the circumference of the associated socket.

3. The display rack of claim 1 wherein the skirt extends vertically downward from the associated socket.

4. The display rack of claim 1 wherein the second frame has a plan view profile and wherein the skirts are within the profile.

5. The display rack of claim 1 wherein the frames each have a generally rectangular plan view shape and the pins are positioned generally at the corners of the rectangular shape.

6. The display rack of claim 5 wherein the skirts are within the rectangular shape.

7. The display rack of claim 5 wherein each of the skirts defines an arc of about 90° around a vertical axis at each corner of the frames.

8. The display rack of claim 5 including each one socket of the second frame engageable with each one pin of the first frame.

9. The display rack of claim 1 wherein the skirt encircles the corresponding post.

10. The display rack of claim 1 wherein the pin includes a flange member which limits travel of the pin into a compatible socket.

11. The display rack of claim 1 further including a latching mechanism for latching the shelf slidably on the first frame.

12. A multiple section display rack comprising in combination:

a first frame including a plurality of vertically extending support posts, some of the posts, including a pin projecting upwardly from the first frame, the first frame further including shelving supported by the first frame;

a second frame, including posts with at least some of the posts including vertically depending sockets arrayed in a pattern whereby the depending sockets receive projecting pins of the first frame to removably support the second frame upon the first frame, said second frame including shelving supported by the second frame, the first frame pins being removable from the second frame sockets upon separation of the first and second frames; and the first frame including a shelf with first and second side rails, the first frame further including a horizontal support rail for the shelf, the shelf side rails including a detent notch for receiving the support rail and supporting the shelf at a position extending from the frame.

13. The display rack of claim 1 or 12 further including a locking mechanism for retaining the frames in a stacked array.

14. The display rack of claim 13 wherein the locking mechanism comprises a latch bar attached to one of the frames and pivotal to engage a hook on the other one of the frames.

* * * * *